June 26, 1962 G. T. RANDOL 3,040,535
PRESSURE DIFFERENTIAL OPERATED BRAKE BOOSTER MECHANISM
Filed Jan. 21, 1958 6 Sheets-Sheet 1

Inventor

*Inventor*

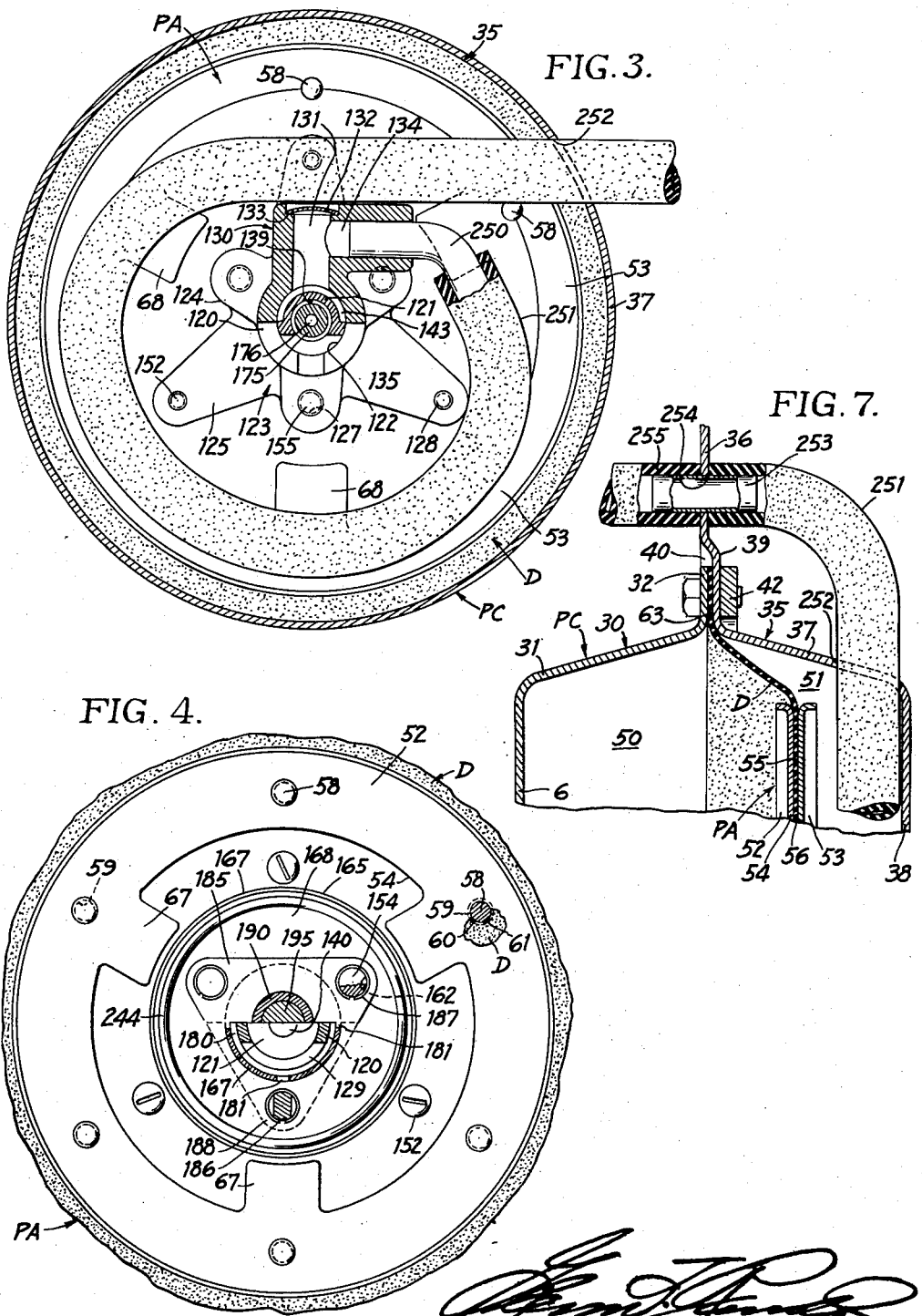

June 26, 1962 G. T. RANDOL 3,040,535
PRESSURE DIFFERENTIAL OPERATED BRAKE BOOSTER MECHANISM
Filed Jan. 21, 1958 6 Sheets-Sheet 5

Inventor

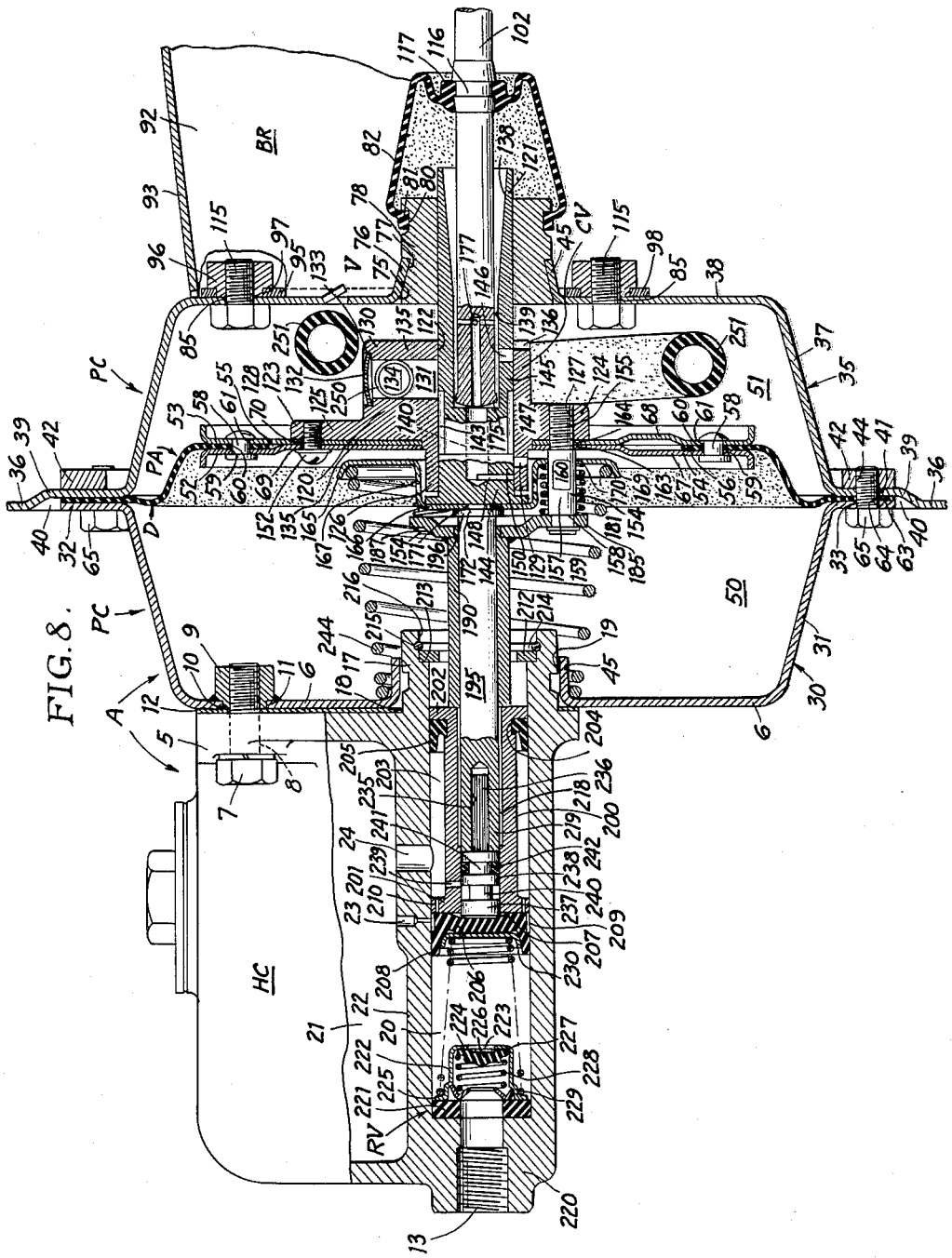

United States Patent Office 3,040,535
Patented June 26, 1962

3,040,535
PRESSURE DIFFERENTIAL OPERATED BRAKE
BOOSTER MECHANISM
Glenn T. Randol, 2nd Ave. and Paull St., Box 275,
Mountain Lake Park, Md.
Filed Jan. 21, 1958, Ser. No. 710,303
9 Claims. (Cl. 60—54.6)

The present invention relates generally to pressure differential operated motors adapted primarily as an actuator for the master cylinder of hydraulic brake systems, or for the actuating means of mechanical brake systems. The invention more particularly relates to an improved servomotor energizable to produce thrust which may be supplemented by physical operating force for use in vehicle braking systems, although other uses are obviously feasible.

The primary object of my invention is to provide a new and novel pressure differential operated motor of the vacuum-type which has special adaptation to operate the conventional hydraulic brake system on motor vehicles and the like, the improvement being primarily concerned with the construction and operation of the control valve which includes reaction means to enable the operator to sense the output of the motor in relation to the braking force required. The present invention further contemplates that a portion of the power cylinder of such motor may be integrated with the vehicle structure in a novel manner.

Stated in more detail, it is an important object of my invention to provide an improved hydraulic brake actuator of the type above referred to in which optional methods of producing reaction on the driver-operated member are obtainable, said member being shown exemplarily as a suspended-type pedal, whereby an awareness or physical perception of the brake-applying force engendered in response to pedal movements is transmitted through the pedal to enable predictable control of the degree of braking effect required to control the vehicle under any and all operating conditions thereof.

The aforesaid optional methods of reactive control are readily obtainable without radical changes in the structure of the present apparatus and may be defined as follows:

(1) Combined proportional hydraulic thrust impressed on a piston and the reaction from a single spring characterized by increasing tension progressively induced in response to operating the brake pedal in a brake-applying direction;

(2) Combined hydraulic thrust impressed on a piston and the reactions from two springs characterized by increasing tension progressively induced in response to operating the brake pedal in a brake-applying direction, one of said springs being the conventional master cylinder piston return spring which also controls the residual pressure check-valve to maintain a minimum pressure in the hydraulic system when the brakes are "off," and therefore, the pre-tensioned weight of this spring cannot be varied, while the other spring is operably disposed within the power chamber of the motor with one end bearing on the end wall thereof and which may be varied to provide the overall desired reaction on the pedal to provide a commercially practical product suited to different classes of vehicles; and (3) A single spring operably disposed within the power chamber of the motor with one end thereof bearing on the end wall of said chamber and the other end reacting on the pedal whereby said spring alone provides increasing tension as may be desired, progressively induced in response to operating the pedal in a brake-applying direction to enable driver control of the degree of braking effect desired under all operating conditions of the vehicle.

Another object seeks to provide new and novel power control valving comprising a pair of telescopically-related relatively movable cylindrical valve elements for controlling energization of the motor and wherein the inner valve element performs the dual functions of relative sliding movement with respect to the outer valve element to effect control of the motor and a portion extending beyond the outer valve element is slidably supported in a bearing rigid with the adjacent end wall of the motor whereby coaxial reciprocable disposition of the movable power member is provided, and wherein the outer valve element is secured to and movable with the power member to produce the usual followup action with respect to the inner valve element.

Another object of my invention importantly related to the object immediately preceding is the provision of a simple and compact control valve mechanism of the type under consideration in which the outer valve element is integrated with the movable power member for movement as a unit, and the inner valve element is slidably supported on the power cylinder and carries said outer valve element and power member whereby alignment of the working parts of the motor and those of the associated master cylinder present no structural problems in the design and interaction of these two principal components which combine to produce the pressure producing mechanism forming the subject-matter of the present application.

Another important feature of the present invention is the integration of a portion of the power cylinder with components of the vehicle to accomplish reduced space for installation of the booster apparatus, and to provide a more rigid assembly of the apparatus on the vehicle. In present-day motor vehicles, due to lowering of the hood line and the use of various power accessories operated by the engine, such as, for example, the power steering hydraulic pump and reservoir, windshield cleaning water reservoir, air conditioning pump, etc., space for such installations in the engine compartment is at a premium, especially for mounting the booster motor and master cylinder on the firewall in coaxial disposition. Under such circumstances, it is, therefore, an object of my invention, to form a portion of the forward side of the firewall with a concavity of substantially cup-shaped configuration, the peripheral marginal portion of said concavity having a plurality of circumferentially spaced threaded holes. A detachable complemental cup-shaped casing is provided at its open end with a peripheral out-turned flange having holes in registry with the threaded holes aforesaid, and the outer peripheral marginal portion of a flexible power-diaphragm with holes in registry with the concavity marginal and flange holes is disposed between the marginal portion on the concavity and the flange of the cup-shaped casing whereby cap bolts inserted through the registering holes into threaded engagement with the threaded holes securely clamp the outer marginal portions of the cup-shaped casing and diaphragm in air-tight assembled relation with respect to the concavity in the firewall to provide the power cylinder with an air chamber continuously vented to atmosphere and a vacuum-power chamber selectively connectable to vacuum and atmosphere. With this arrangement the overall length of the apparatus in the engine compartment is appreciably reduced and the assembly thereof on the vehicle more rigidly integrated with the vehicle firewall. In this way, the air chamber of the motor is disposed in the firewall within the driver's compartment while the vacuum-power chamber is provided within the detachable casing on the engine compartment side of the firewall to produce an extremely compact power-assist unit in the hydraulic brake system.

Another salient feature of my invention resides in the utilization of new and novel composite valve return spring means disposed ahead of the movable power diaphragm within the vacuum-power chamber, said means comprising a plurality, preferably three in number, of normally preloaded compression springs, each encircling a thrust stud of a three studded cage assembly adapted to transmit thrust to a pressure-transmitting member with one end of each spring reacting on a spring seat slidably mounted on said studs and operatively engaging the inner valve element whereby pedal movement of said valve element in a motor-energizing direction is opposed by said springs, said spring seat also being adapted to receive reaction from the reactive spring within the power chamber referred to above, to provide the operator with a "feel" of the degree of motor energization.

With these and other objects and advantages in view, the invention consists of the new and novel combination, construction, and arrangement of parts as hereinafter more fully described, set forth in the claims appended hereto, and disclosed in the accompanying drawings forming part hereof, wherein:

FIGURE 1 is a schematic view of a side elevation of my improved liquid pressure producing mechanism constructed in accordance with the present invention, and exemplarily shown connected diagrammatically to operate a hydraulic braking system conventionally employed on automotive vehicles and the like;

FIGURE 3 is a transverse sectional view taken along the line 3—3 of FIGURE 2 showing details of the control valve structure and associated flexible vacuum conduit leading to the exterior of the motor;

FIGURE 4 is another transverse sectional view taken along the line 4—4 of FIGURE 2 showing the forward side of the power member and associated parts of the control valve and reactive spring mechanism;

FIGURE 7 is a sectional view taken along the line 7—7 of FIGURE 6 showing details of the tubular fitting through the firewall of the vehicle for interconnecting the flexible conduits leading from the engine inlet-manifold to the control valve for the motor;

FIGURE 8 is a view similar to FIGURE 2 but showing the parts operated to apply the brakes;

Figure 1:
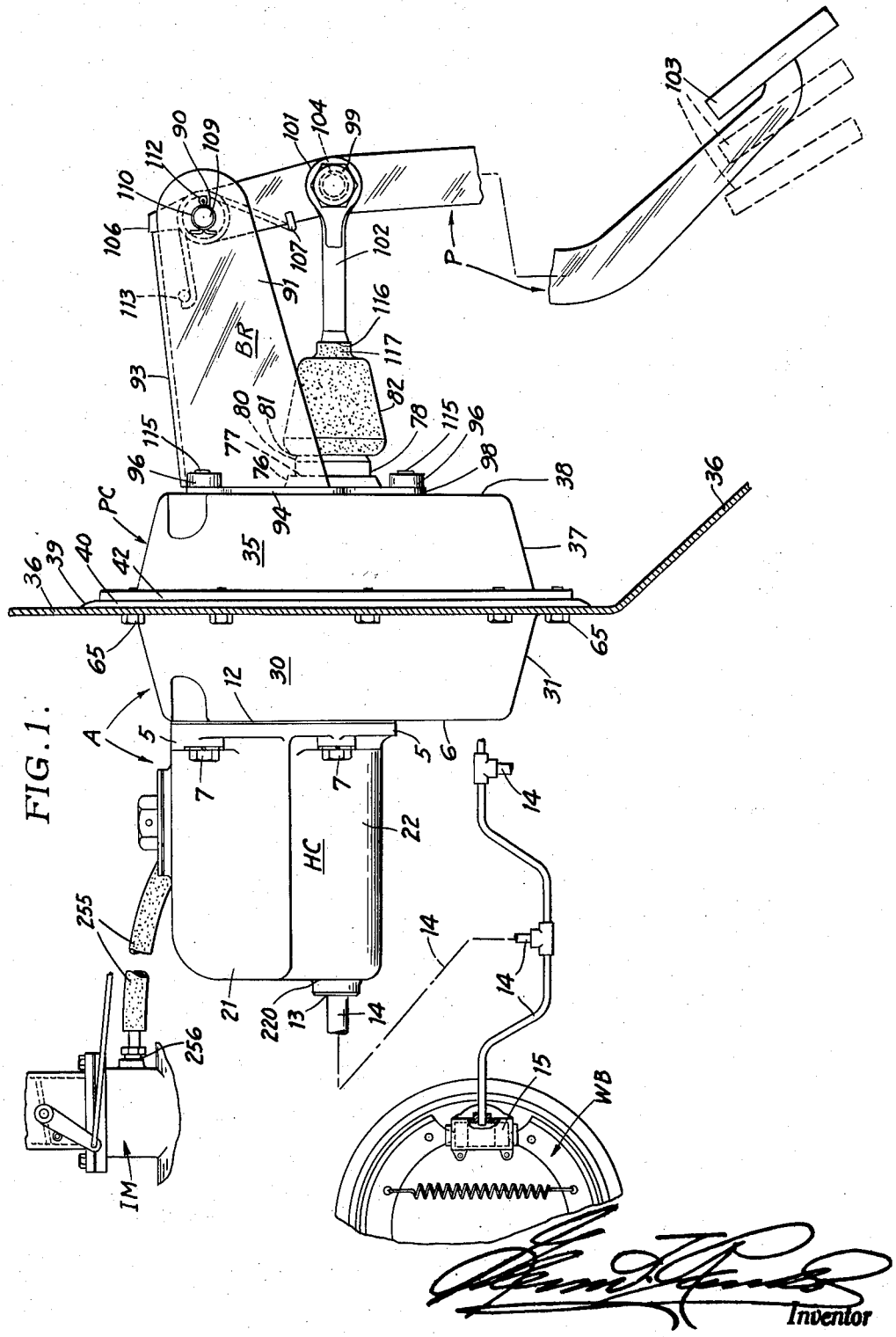

Like reference characters designate like parts in the several views with like parts in the two modifications (FIGURES 9 and 10) being distinguished, however, by the suffixes "a" and "b" respectively.

Referring now to the drawings, and particularly FIGURES 1, 2, 2A, 3 and 4, my improved hydraulic pressure producing device or actuator generally designated "A" comprises a fluid pressure actuated motor, or more specifically a vacuum power cylinder, "PC," and a hydraulic master cylinder "HC" having an integral end flange 5 for supporting the master cylinder in operating position on the forward end wall 6 of the power cylinder as by a plurality of cap screws 7 (preferably four in number) projecting through suitable openings 8 in marginal portions of the flange 5 into threaded engagement with internally threaded collars 9 having reduced diameter end portions 10 pressfitted and/or welded into circular openings 11 provided in the power cylinder end wall 6 whereby the master cylinder and power cylinder are combined as a unitary assembly to produce the device A. A gasket 12 is disposed between the confronting faces of the flange 5 and end wall 6 to effect an air-tight seal therebetween. The end of the master cylinder remote from the power cylinder has a discharge port 13 which is connected by a branched hydraulic line or conduit 14 to one or more hydraulically-actuated motors or wheel cylinders 15, the latter being commonly employed to operate the wheel brakes generally designated "WB" of motor vehicles and the like as exemplarily illustrated in FIGURE 1. A cylindrical hub 17 projects rearwardly from the flange 5 through registering circular openings 18 and 19 provided in the central coaxial portions of the gasket 12 and end wall 6 respectively, said hub serving to stabilize the master cylinder HC in coaxial disposition with respect to the power cylinder PC as shown.

The interior of the hydraulic cylinder HC comprises: a pressure working chamber 20 and a liquid reservoir 21 separated by a cylindrical wall 22 which at its forward end encircles the pressure chamber, said wall including a compensating port 23 and an intake port 24 therethrough for controlling liquid communication between the reservoir 21 and pressure chamber 20 and the interior of the cylinder 22 respectively, the latter being coaxially disposed with respect to the cylindrical hub 17. The pressure chamber serves to transmit liquid under pressure via the discharge port 13 to the wheel cylinders 15 to operate the wheel brakes WB in a well understood manner.

The power cylinder PC is preferably a differential air pressure operated motor, utilizing either vacuum or compressed air to produce the necessary differential across opposite sides of a power assembly reciprocably mounted within the cylinder, and generally designated "PA" to operatively energize the same. In ordinary automotive installations, a vacuum-operated motor is preferred to one operated by compressed air, since the engine inlet-manifold, such as shown fragmentarily at "IM" in FIGURE 1, may serve as the vacuum production source.

Figure 2:
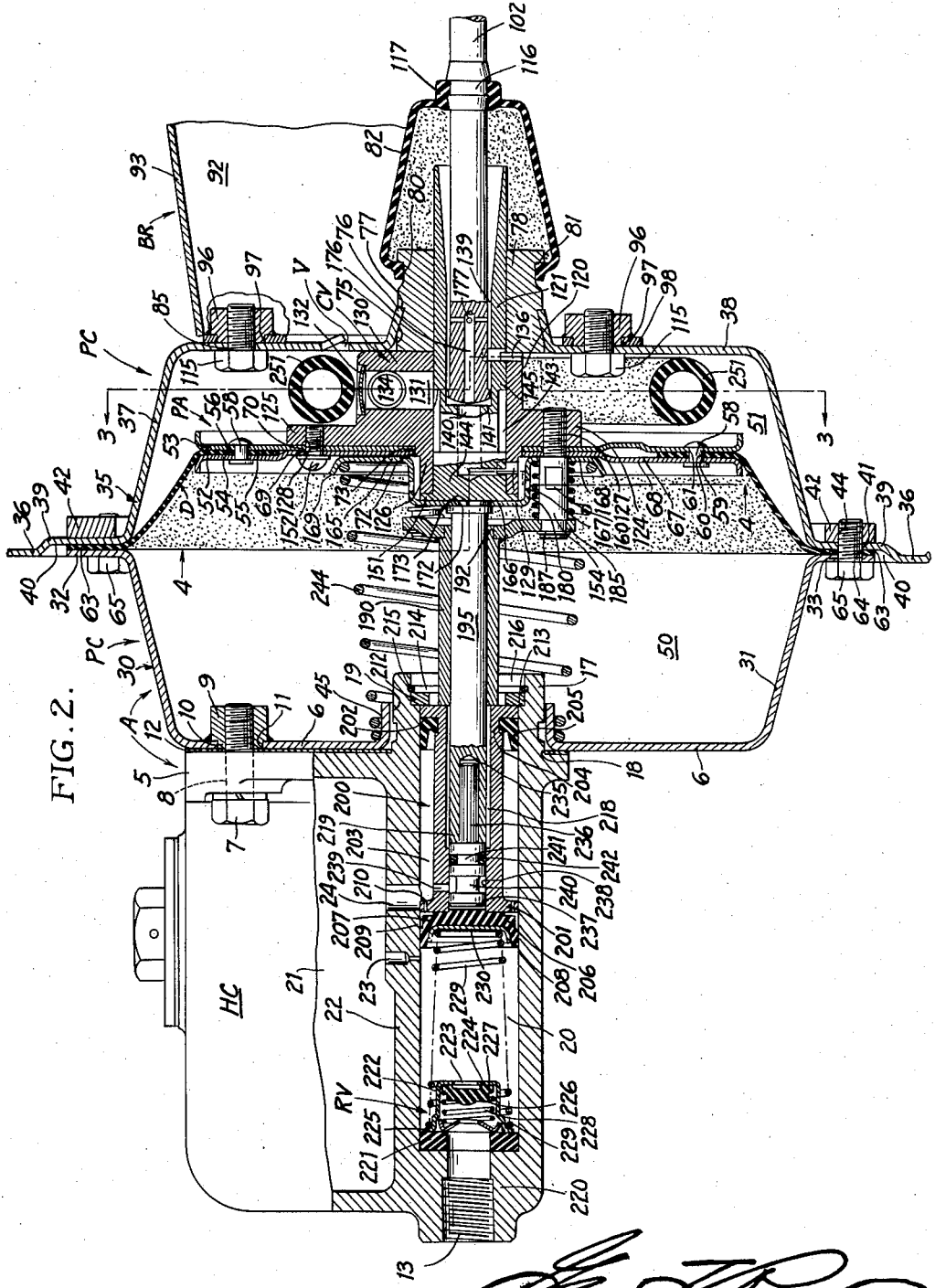
FIGURE 2 is a longitudinal sectional view on an enlarged scale, partly in side elevation, of the mechanism per se illustrated in FIGURE 1 wherein the vehicle brakes are fully released.
Figure 6:
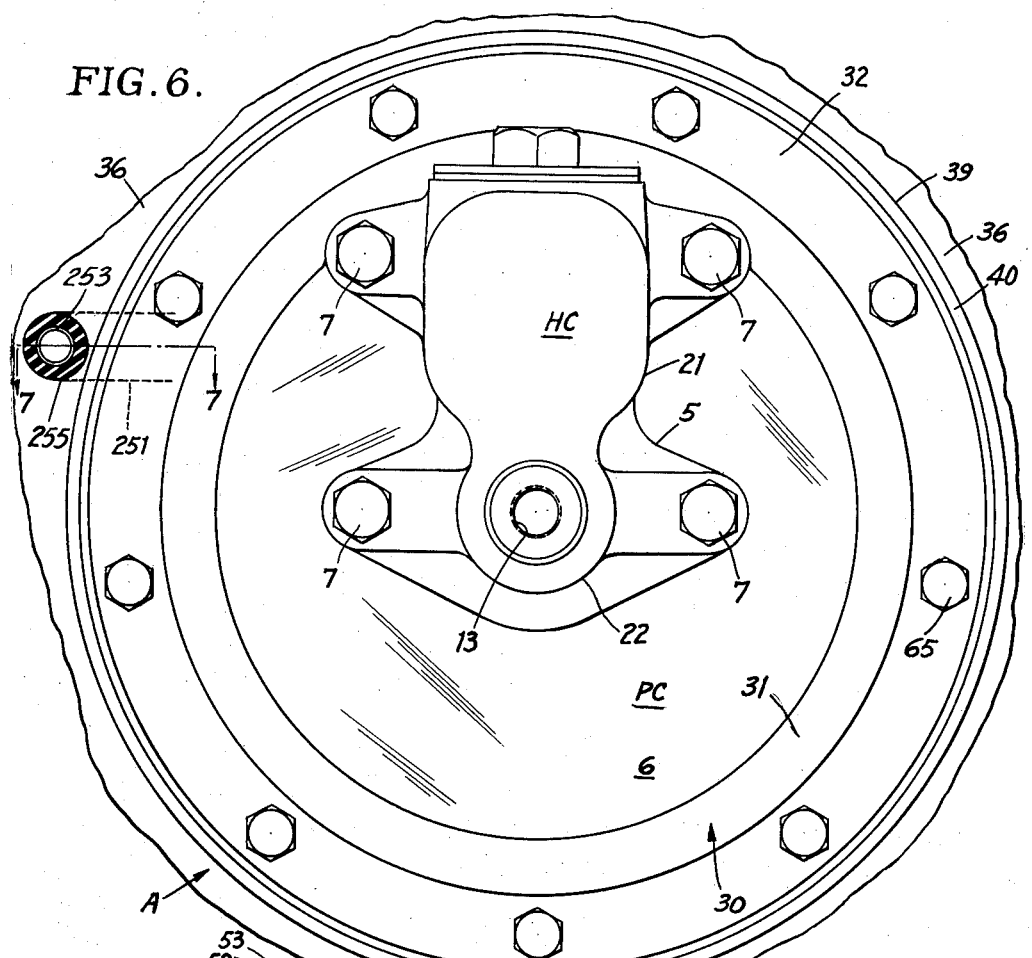
FIGURE 6 is a front elevation of the motor showing the master cylinder.

The vacuum-operated power cylinder PC in the preferred embodiment of the invention (FIGURE 1) is air-suspended; i.e., air at atmospheric pressure is normally on both sides of the movable power assembly PA which may take the form of a solid piston or flexible diaphragm, when the booster apparatus is in released position best demonstrated in FIGURE 2. Although a vacuum-suspended power cylinder is readily adaptable in the present invention, there are certain advantages accruing from the use of an air-suspended power cylinder as, for example, the chamber constantly vented to atmosphere does not have to be sealed. That is to say, the angular movement of the mechanical operating connections which enter the atmospheric chamber during the pressure stroke do not create any structural problems in the design of the power cylinder from a sealing standpoint. Moreover, operation of an air-suspended power cylinder is inherently smoother and less sensitive than the operation of a vacuum-suspended power assembly, and therefore, more controllable by the operator. On the other hand, speed of operation which is the primary advantage of the vacuum-suspended arrangement, is not considered vital in installations where my improved pressure-producing device or actuator A would most likely be used against installations in heavy-duty installations, such as busses and trucks. Actually, a slowed more controllable build-up of power force during initial stages of vehicular braking application is conducive to preventing unpredictable sudden stops, particularly those stops during low vehicular speeds as when cruising in congested traffic-light controlled intersections, etc.

The vacuum-operated cylinder PC comprises: a forward detachable cup-shaped casing or shell 30 formed with an angular or tapered circular wall 31 and said end wall 6 on the exterior of which the master cylinder HC is supported best demonstrated in FIGURE 1, the open end of the casing terminates in an annular outturned flange 32 parallel to the end wall aforesaid and is provided with a plurality of circumferentially spaced holes 33. A complemental casing or shell 35 having a concavity similar to that of the shell 30 is rearwardly impressed into a support member constituting a component of the vehicle body and exemplarily shown as the vehicle firewall 36, and therefore, an integral portion thereof, said shell 35 having a circular tapered wall 37 and an end wall 38 with its open end offset at 39 to provide an annular recessed portion 40 parallel with the end wall 38, and which registers with the flange 32 on the detachable shell 30. A corresponding number of holes 41 is provided in the recessed portion, and a reinforcing metallic ring 42 is secured, as by welding, to the rear side of the recessed portion and is provided with threaded holes 44 corresponding in number and spacing to the holes 33, 41 in the flange and recessed portion respectively. The central opening 19 is encircled by an integral inturned circular flange 45 to stiffen this portion of the end wall 6 and for another special purpose to appear.

The power assembly PA, which is referred to elsewhere in this specification and in certain of the claims as a pressure-responsive movable wall or member, power diaphragm or piston for flexibility in terminology, is operably disposed between the end walls 6, 38 of the power cylinder to provide a control or vacuum-power chamber 50, and an atmospheric chamber 51 respectively on opposite sides of the movable wall, said power assembly comprising a pair of cup-shaped juxtapositioned plates 52, 53 mounted back-to-back with the peripheral marginal wall portion of plate 52 offset outwardly at 54 to provide an external annular channel 55 therebetween for reception of an inner marginal portion 56 of a ring-type flexible diaphragm "D," preferably made of rubber coated fabric. A plurality of fasteners such as rivets 58 are inserted through registering holes 59, 60, 61 circumferentially spaced through the offset portion 54, inserted portion of the diaphragm and the other plate respectively to secure the inner marginal portion of the diaphragm to the plates in air-tight assembled relation for movement as a unit. The outer marginal portion 63 of the diaphragm is provided with holes 64 which register with the holes 33, 41, 44 aforesaid, and is disposed between the confronting faces of the flange 32 and recess 40. A corresponding number of cap screws 65 are inserted through the holes 33, 41, 64 into threaded engagement with the threaded holes 44 in the reinforcing ring 42 whereby compression is imposed on the outer marginal portion aforesaid of the diaphragm D when the cap screws are drawn tightly to effect an air-tight seal between the vacuum and atmospheric chambers 50, 51 and exterior of the power cylinder PC, best shown in FIGURE 2. A plurality of reinforcing ribs at 67, preferably three in number, are impressed in the plate 52 in the same plane with the offset portion 54, and oppositely disposed similar ribs at 68 are pressed in the plate 53, said ribs serving to add stiffness to the diaphragm plates. A plurality of registering holes 69, 70, preferably three in number, are provided in the plates 52, 53 respectively in circumferentially spaced relation and inwardly spaced radially from the rivets 58, the purpose of which will be referred to later, and the central portions of said plates are each provided with coaxial circular openings 72, 73 respectively.

A central circular opening 75 is provided in the end wall 38 of the power cylinder casing 35 in coaxial disposition with respect to the forward opening 19 in the casing 30. The marginal portion of opening 75 is provided with an outturned circular flange 76 radially closed inwardly into an external annular groove 77 formed with an angular bottom in the outer cylindrical surface of a bearing collar 78 to make the collar rigid with the end wall 38. Another external annular channel 80 adjacent the outer end of the collar is spaced from the groove 77 for reception of a bead 81 defining the large end of a flexible dust excluding boot 82.

A plurality of holes 85, preferably three in number, is provided in the wall 38, the purpose of which will be later referred to, and a vent "V" is provided through the wall 38 to maintain chamber 51 at atmospheric pressure.

Figure 5:
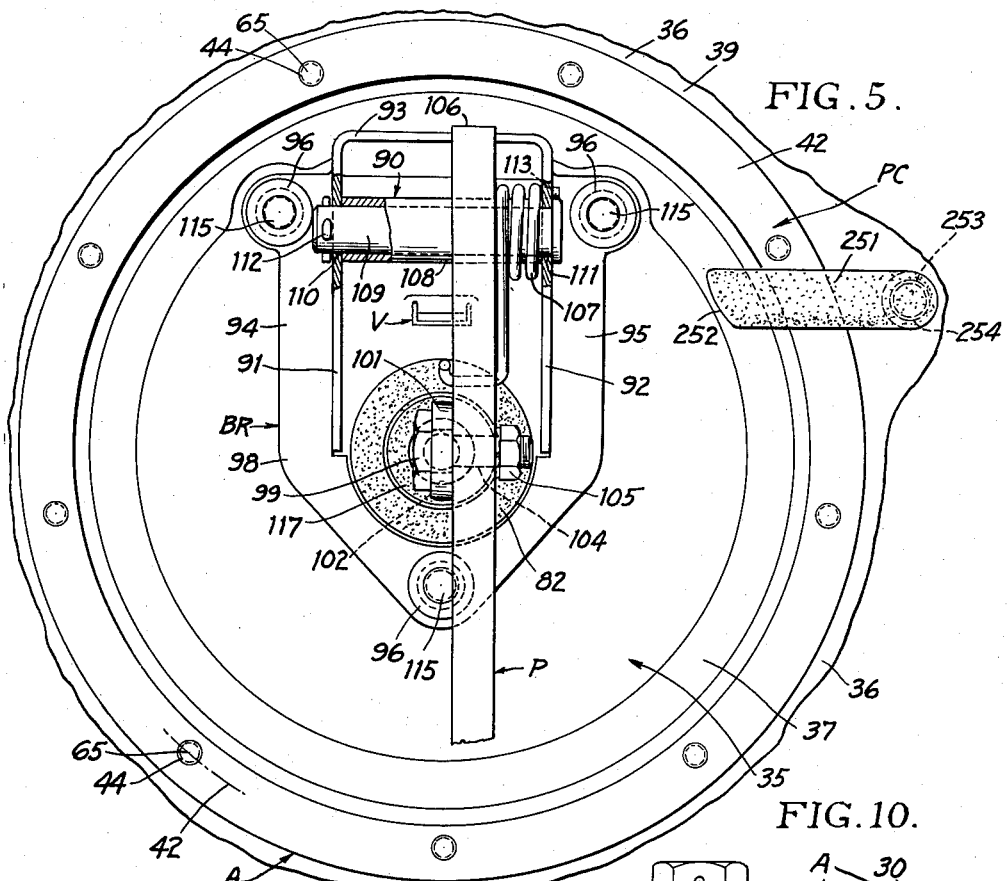
FIGURE 5 is a rear elevation of the motor showing the suspended-pedal mechanism.

The pressure chamber 20 of the master cylinder HC is effective to transmit liquid under pressure therefrom through the discharge port 13 to the wheel cylinders 15, such pressure being developed jointly by the force exerted by the movable wall of the power cylinder PC and the force exerted by the operator on a pedal "P," or either of the aforesaid operating forces acting independently of each other. The upper end of the pedal is pivotally supported at 90 on a bracket designated "BR" of generally inverted U-shaped configuration in cross section and having a pair of spaced side walls 91, 92 interconnected by an upper wall 93, said side walls terminating at their forward ends in outturned lateral flanges 94, 95 respectively, each of which carries at its upper end a threaded collar 96 having its forward end reduced and pressfitted and/or welded into a hole 97 through the flange to provide a rigid assembly thereof. A generally V-shaped web segment 98 connects the lower ends of the lateral flanges aforesaid, and adjacent the vertex thereof is a threaded collar similar to collars 96 made rigid with this segment in the same manner. The bracket is supported on the wall 38 forwardly of the steering column (not shown) in the operator's compartment of the vehicle, and at a point below the pivot 90, the pedal P is pivotally connected, as by means of a shouldered hex-headed pin 99 passing through an eye rod end 101 forming the end of a thrust or push-type rod 102 to provide, for example, a 5 to 1 leverage ratio between the thrust connection aforesaid and a foot pad 103 at the lower terminus of the pedal P. The reduced threaded portion of the pin 99 projects through a hole 104 in the pedal and fixed on the pedal by nut 105. The upper end of the pedal terminates in a projection 106 which is adapted to engage the rear edge of the upper wall 93 to establish the fully released or normal position of the pedal under influence of a torsional spring 107 carried on a tubular sleeve 108 rigid with the pedal and through which the pivotal connection 90 is formed with a headed cross pin 109 projecting through aligned openings 110, 111 in the side walls 91, 92 respectively of the bracket and the sleeve, said pin being prevented from axial displacement by a cotter pin 112. The torsional spring has one leg acting on the pedal and the other leg anchored in a hole 113 through the side wall 92, all as shown clearly in FIGURES 1 and 5. Cap screws 115 project through the previously mentioned holes 85 in the wall 38 into threaded engagement with the threaded collars 96 to rigidly anchor the bracket BR on the firewall 36. Accordingly the present invention is especially adapted for installation in motor vehicles equipped with present day suspended-pedal mechanism originally employed to operate master cylinders mounted on the vehicle firewall in the engine compartment.

Forwardly spaced from the rod end 101 is an external annular groove 116 on the push rod 102 which receives a bead 117 forming the outer small end of the dust boot 82 whereby the operating parts projecting through the collar 78 are protected from dust, etc.

The control valve mechanism generally designated "CV" is of new and novel construction and comprises: a pair of outer and inner telescopically-related cylindrical elements 120, 121 respectively. The outer element disclosed as a sleeve is constructed with a longitudinal bore 122 therethrough for slidably receiving the inner element and a medially disposed external composite flange 123 having a plurality of short and long equally spaced radially projecting fingers or extensions 124, 125 respectively (preferably three of each), the short extensions 124 being thicker rearwardly than the longer ones while the forward faces of said extensions lie in the same plane from which a short portion of the valve sleeve 120 projects forwardly and terminates in a reduced diameter portion 126 as a continuation of the valve sleeve. The short fingers are each provided adjacent their ends with a threaded hole 127, and the longer fingers similarly carrying threaded holes 128, a cross slot 129 is provided adjacent the forward end of the valve sleeve, and a radially disposed integral L-shaped boss 130 is positioned on the rear side of one of the short extensions and provided with a radial passageway 131 closed at its upper end by a press-fitted expansion plug 132 engaging a counterbore shoulder 133 in its wall, said passageway continuously communicating with the bore 122 in an intersecting transverse passageway 134, the rear face of the boss being in the same plane as the rear end of the valve sleeve to provide a finished end surface 135 adapted to engage the confronting inner face of the motor end wall 38 to act as a stop to establish the normally released status of the valve elements and associated mechanism. An air slot 136 is indented in the rear end of the valve sleeve wall. The inner valve element disclosed as a piston comprises: an inwardly tapered counterbore 138 merging with a coaxial cylindrical counterbore 139 which in turn merges with an inner reduced diameter blind coaxial bore 140, the point of mergence of the latter two bores providing an internal annular shoulder at 141. Forwardly disposed on the valve piston is an annular space 143 provided between a forward valve land 144 and a rear land 145 extending to the outer end of the valve piston 121. A cross slot 146 intersects counterbore 139 and is adapted to communicate constantly with the indented slot 136 whereby the interior of the control valve piston 121 is maintained vented to atmosphere via slots 136, 146, chamber 51 and vent V. A forwardly positioned cross slot 148 is provided in the valve piston which normally interconnects the interior thereof via cross slot 129 with the power chamber 50 whereby this latter chamber is vented to atmosphere to equalize pressures on opposite sides of the movable power assembly PA which status is shown in FIGURE 2. A preferably narrow arcuate working land 150 is provided between the cross slot 148 and annular space 143 and which is operable to selectively connect the cross slot 129 to the atmospheric chamber 51 and to the vacuum-power chamber 50, said annular space 143 being subject to vacuum at all times via passageways 131, 134 when the source IM is subject to subatmospheric conditions induced by operation of the engine. The inner end of the valve piston terminates in an external annular flange 151 which normally engages the end of the reduced portion of the valve sleeve 120 when the power chamber 50 is vented to atmosphere. The rearward portion of the control valve piston 121 extending beyond the right end of the valve sleeve 120 is slidably supported in and projects through the bearing collar 78 as shown in FIGURE 2, whereby the power assembly PA is movably supported on the collar 78 by said valve piston to produce novel cooperative relationship therebetween as will appear.

The diaphragm plates 52, 53 are mounted on the aligned forward faces of the flange extensions aforesaid with their central circular openings 72, 73 receiving the short normal diameter portion of the outer valve element in circular alignment therewith. Cap screws 152 inserted through the plate holes 69, 70 into threaded engagement with the threaded holes 128 secure the diaphragm plates in a rigid assembly with the flange 123 for movement therewith. A plurality of forwardly projecting studs 154 (preferably three in number), and which are equally spaced circumferentially about the forward extension 126 of the outer valve element, is provided with a reduced rearwardly projecting threaded portion 155 defining an external annular shoulder at 156, a forwardly reduced smooth diameter portion 157 defining an external annular shoulder at 158 with a smooth medial normal diameter portion 159, the latter portion being provided with oppositely disposed flats 160 for reception of, for example, an open end wrench whereby manual turning movement may be imparted thereto for assembly purposes. The reduced smooth diameter portion 157 is provided with an annular external groove 162 spaced from its shoulder 158. The threaded portions of the studs 154 are inserted through registering holes 163, 164 in the plates 52, 53 respectively into threaded engagement with the holes 127 in the short extensions of the flange 123 whereby when the studs are drawn tightly the shoulders 156 supplement the cap screws 152 to rigidly attach the diaphragm plates 52, 53 to the flange 123 thus producing the movable power assembly PA best demonstrated in FIGURES 2, 3 and 8.

A cup-shaped spring seat member 165 is constructed with an end wall 166 and a cylindrical interconnecting wall 167, the latter terminating in an outturned annular flange 168 having its peripheral marginal portion 169 slightly inturned for stiffness. A plurality of holes 170 is provided through the flanged portion and corresponding in number and spacing to that of the studs 154 aforesaid to slidably mount the seat member 165 on the portion 169 thereof. The central portion of the end wall is apertured at 171 with a circular portion greater than a half-circle interconnected by a straight edge 172 for reception of a complementally formed forward end extension 173 on the valve piston 121 to locate the spring seat 165 and valve piston 121 against relative rotation thereby maintaining the valve piston control slots in correct operating relation with respect to the control slots in the valve sleeve. Accordingly, sliding movement of the valve piston is correspondingly imparted to the spring seat member 165, said sliding movement being effected by engagement of the inner end 175 of the push rod 102 with the shoulder 141 in response to depressing the pedal P as is well understood. The inner end of the push rod is provided with a blind longitudinal bore 176 in coaxial alignment with the bore 140 and a plurality of intersecting cross bores at 177 to enable unrestricted ingress of air to the control slot 148, such arrangement supplementing the loose fit of the end 175 into the counterbore 139 which enables air to freely circulate around the end 175 into the bore 139. As will be noted from a closer inspection of FIGURES 2 and 2A the cylindrical wall portion 167 of the spring seat 165 is larger in diameter than the diameter of the reduced terminus 126 of the control valve sleeve 120 to provide an annular space 180 therebetween, said cylindrical wall also being provided with a plurality, preferably four in number, of holes 181 to maintain communication between the power chamber 50 and valve control slot 129 when the flanged portion of the seat 165 is engaging the forward confronting face on the diaphragm plate 52.

Figure 2A:
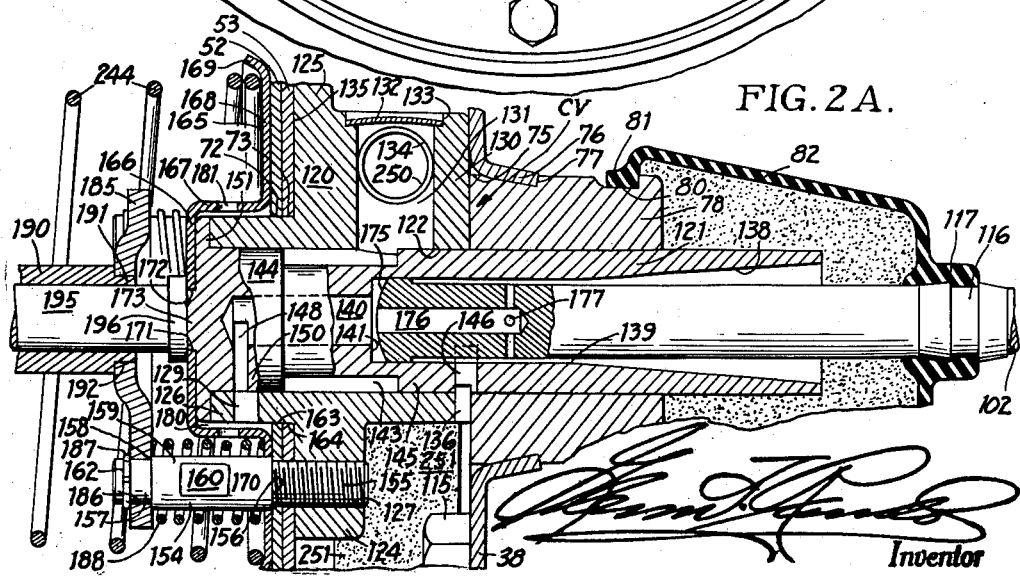
FIGURE 2A is a fragmentary view of FIGURE 2 on an enlarged scale showing the control valve structure and closely associated parts to clarify the detail.

A triangular-shaped thrust plate 185 having holes 186 adjacent the rounded corners thereof is carried on the reduced smooth ends 157 of the studs 154 and which is prevented from displacement by split retainer rings 187 engaging the grooves 162 to confine the corners of the plate between the rings and shoulders 158 for movement as a unit as best demonstrated in FIGURES 2, 2A and 3. Encircling each stud is a normally preloaded compression spring 188 having one end bearing on the inner face of the plate 185 adjacent the holes 186 and the other end reacting on the spring seat 165 to thus bias the spring seat into engagement with the forward face of the diaphragm plate 52 and the valve piston to its released position wherein a portion of the rear face of the wall 166 of the seat 165 engages the confronting end of the reduced portion 126 of the valve sleeve 120 thereby placing the movable power assembly PA and control valve CV in their respective released positions shown in FIGURE 2.

A tubular pressure-transmitting or work member 190 has one end secured to the central portion of the thrust plate 185 which is centrally apertured at 191 for receiving the reduced shouldered end 192 of the member 190 further made rigid with the plate 185 as by welding. Slidably extending through the tubular member 190 is a hydraulic thrust receiving rod 195 which is formed at its inner end with an annular flange 196 engaging the extension 173 on the valve piston 121 for movement therewith. This flange 196 is predeterminately spaced normally from the inner confronting face of the plate 185 to provide the limits of what may be termed the "relative-operating-movement" between the valve piston and sleeve 121, 120 which enables the working land 150 to control the associated slot 129, that is to say, selectively connect it to the vacuum source and to atmosphere to effect operative energization of the movable power assembly PA or release it respectively.

The forward end of the tubular member 190 engages the conventional spool-type piston 200 for unitary actuation in the cylinder 22 to pressurize the fluid in the working chamber 20 as is well understood. The structure of this piston comprises: an annular headland 201; an annular flange 202 spaced rearwardly from the headland to provide an annular fluid space 203 therebetween, the latter having uninterrupted communication with the aforesaid intake port 24 therefore the reservoir 21; an annular channel 204 adjacent the flange 202 for reception of a fluid-retaining seal 205; a primary cup seal 206 having a bottom wall 207 and a peripheral lip 208 provided with circumferentially spaced flutes 209 in the outer surface thereof, said primary cup being mounted on the forward face of the headland to move as a unit therewith; a plurality of ports 210 through the peripheral portion of the headland controlled by the peripheral overlying portion of the seal bottom wall 207, the forward edge of the lip 208 normally lying to the rear of the compensating port 23 to uncover the same as shown in FIGURE 2; a backing washer 212 serves as a stop means for the released position of the piston 200, said washer being stabilized between an internal annular shoulder 213 and a retaining ring 204 engaging an internal annular groove 215 formed in a counterbore 216 which terminates the rear hub portion of the cylindrical wall 22; and a blind axial bore 218 provided in the piston 200 for reception of the free end 219 of the thrust rod 195 into engagement with the closed end of said bore. An end wall 220 closes the forward end of the cylinder 22, and through which the aforesaid discharge port 13 passes. Operatively associated with said port and end wall is the conventional residual pressure check-valve generally designated "RV" comprising a removable annular valve seat 221 which encircles the port 13; a cup-shaped housing 222 having an opening 223 through its end wall 224 with the open end of said housing being formed as an outturned annular flange 225 adapted to engage said seat 221; a one-way check-valve 226 adapted to accommodate excursion of brake fluid from the working chamber 20 through the residual check-valve and thence into the discharge port 13 to actuate the brakes as is understood; an annular valve seat 227 defining the opening 223; and a normally preloaded spring 228 reacting between the housing 222 and check-valve 226 to releasably engage the latter with its cooperating seat 227. Another normally preloaded spring 229 is operably positioned within the working chamber 20 to react between the flange 225 and a metallic cup-shaped spring seat 230 contiguous to the bottom wall 207 of the primary cup to stabilize said cup against the forward face of the headland 201 and yieldably engage the flange 225 with its cooperating seat 221, and also to serve as a means for returning the piston 200 to its normally released position as shown in FIGURE 2 wherein the flange 202 abuts the backing washer 212.

The pressure working chamber 20 is closed at its end remote from the flange 5 by an end wall 220 through which the aforesaid discharge port 13 extends. A removable valve seat 221, preferably of pliant material, encircles the inner end of the port 13 and is adapted to engage the finished surface on said end wall within the pressure chamber. A residual pressure check-valve generally designated "RV" having a cup-shaped housing 222 with an opening 223 through its end wall 224, and its open end is formed as an outturned annular flange 225 parallelly disposed with respect to its end wall, and which movably engages the seat 221, said check-valve assembly including a self-contained pressure discharge one-way check-valve 226 for enabling liquid under pressure to be displaced through the discharge port 13, and which co-operates with an annular seat 227 encircling the opening 223 under influence of a normally preloaded compression spring 228. A normally preloaded compression spring 229 of preferable conical configuration, is operably disposed within the pressure working chamber 20 with one end thereof bearing on the opposite side of the outturned flange 225 and the other end reacting on the bottom wall 207 of the cup seal via a metallic cup-shaped spring seat 230 whereby the biasing action of said spring controls seating of the check-valve assembly RV and return of the piston 200 to released position wherein the flanged end 202 engages the backing washer 212 best depicted in FIGURE 2.

The forward free end of the thrust rod 195 is provided with a closed end axial bore 235 which receives the reduced extension 236 of a hydraulic reactive piston 237 which engages the end of the rod 195 and slidably fits into a longitudinal bore 238 extending from the face of the headland 201 to merge with the counterbore 218. A radial passageway 239 is provided through the wall of the bore 238 to connect the annular space 203 with the interior of said bore. The piston 237 is provided with an annular space 240 in continuous communication with the radial passageway 239 to return any leak-by liquid to the reservoir, and another annular channel 241 spaced rearwardly from the annular space aforesaid receives a pliant ring-type seal 242 to prevent liquid from bypassing the piston 237 into the vacuum-power chamber as is understood. In the normal fully retracted disposition of the piston 237 portrayed in FIGURE 2 the forward end thereof is slightly spaced from the confronting portion of the cup seal bottom wall 207, but immediately prior to the working land 150 of the control valve CV placing the control slot 129 in communication with the vacuum space 143, the wall of the cup seal is engaged to transmit the combined reaction produced by pressure of the liquid on the piston 237 and the spring 229 via the rod 195 to the valve piston 121 and thence via the push rod 102 to the pedal P. Accordingly, the spring 229 possesses the characteristics of increasing tension progressively induced in response to operating the pedal P in a brake-applying direction, and when the pedal is operated in a releasing direction the spring is effective on the piston head 201 and piston 237 to return these two pistons and connected parts to their respective released positions clearly depicted in FIGURE 2. In this way, the spring 229 does not have to be overcome by the power assembly during power-boost since the force exerted by the operator on the pedal P moves the spring seat 230 out of engagement with the piston head 201 and only when pressure is removed from the pedal P can the seat engage both pistons.

A reactive and return spring 244, preferably of conical configuration, is operably positioned within the vacuum-power chamber 50 in encircling relation with respect to the valve return springs 188. The smaller end of this spring bears on the inner face of the end wall 6 and is stabilized by the inturned flange 45, and the larger end reacts on the flanged portion 168 of the spring seat 165 and is seated within the marginal inturned portion 169 to provide supplemental similar operating characteristics to those of the spring 229 for reaction on the pedal P whereby the combined expansive forces of the springs 229, 244 react on the pedal in conjunction with the proportional hydraulic thrust on the piston 237 to provide the driver with "feel" of the degree of braking force effective at any given position of the pedal P.

It is important to note here that the spring seat member 165 is literally caged between the thrust plate 185 and confronting face portion on the diaphragm plate 52 clearly shown in FIGURES 2 and 8, and since the aperture connection 171 with the extension 173 on the valve piston 121 is designed to provide axial "floating" action therebetween so that any deflecting radial lines of force that may be induced by the springs 188 and 244 reacting on the spring seat, will not be transferred to the valve piston thereby thus preventing eccentric wear between the two relatively sliding valve elements 120, 121. Also it should be observed that the limits of relative operating movement of the valve piston with respect to the valve sleeve are defined by the spring seat engaging the end of the reduced portion 126 of the valve sleeve and diaphragm plate 52 in a released direction, and by the annular flange 196 on the reactive rod 195 when engaged with the confronting face of the thrust plate 185 in a brake-operating direction of movement. It is further contemplated that the spring seat member 165 may be effective for its end wall 166 to engage the flanged end of the valve piston which in turn engages the inner end of the valve sleeve, and the flanged portion 168 simultaneously engages the diaphragm plate 52, or the end wall 166 may be effective to act on the valve sleeve or the flanged portion 168 on the diaphragm plate 52 to effect return of the movable power assembly PA to its normally released status portrayed in FIGURE 2. This latter arrangement being possible since the tubular valve element 120 is rigid with the diaphragm plates 52, 53, therefore, the spring seat 155 may act separately or simultaneously on the valve sleeve and plates 52, 53 to effect return of the power assembly to released position under influence of the springs 229, 244 in response to removing pressure from the pedal P.

A rigid angular tubular fitting 250 has one end pressed into the control valve passageway 134 and the free end receives one end of substantially a convolution of flexible conduit or hose 251, and the other end of this hose projects through a hole 252 in the wall 37 of the power cylinder casing 35 integral with the vehicle firewall 36. The exterior portion of the hose 251 is bent in substantially a 90° curve with the end tightly pressed on one end of a rigid straight tubular fitting 253 which projects through a hole 254 in the firewall 36, the other end of this latter fitting receives one end of another flexible conduit or hose 255, the other end of the latter hose being connected to a rigid tubular fitting 256 threadedly attached, for example, into the wall of the inlet-manifold base IM on which the engine carburetor is mounted, a fragmentary portion of the carburetor being generally designated "EC" thereby placing the interior of the inlet-manifold IM in constant communication with the control valve passageway 134 best shown in FIGURES 1, 5, 6, and 7.

The ends of the conduits 251, 255 on opposite sides of the firewall 36 are pressed into intimate contact with the firewall to stabilize the tubular fitting 253 interconnecting these ends, thus providing a simple and effective method of connecting the control valve assembly CV to the source of vacuum without disrupting the effectiveness of the firewall to prevent fumes, cold air, etc., from entering the driver's compartment.

The invention further contemplates association of filtering material with the vent V to silence the ingress of air into booster chamber 51 during a brake-releasing operation and to prevent foreign matter from involving the moving parts of the control valve mechanism CV as is well understood.

Operation

The operation of my improved brake-booster mechanism A will be apparent from the foregoing description but may be summarized as follows:

Assuming that the device A is installed on a motor vehicle as the present disclosure exemplarily demonstrates in FIGURE 1, to operate the hydraulic brake system commonly employed on such vehicles, in released "brake off" condition as depicted in FIGURES 1, 2 and 2A. With the engine running, reduced pressure (vacuum) is produced within the inlet-manifold IM which is conveyed through conduit 255, fitting 253, conduit 251, and fitting 250, passageways 131, 134 to evacuate air from the annular valve space 143 on the valve piston 121 which conditions the control valve mechanism CV for operation to cause operative energization of the power cylinder PC as is understood.

In the normally released disposition of the valve sleeve and piston 120, 121 portrayed in FIGURE 2, the vacuum-power and air chambers 50, 51 respectively are vented to atmosphere, the power chamber being vented via holes 181, annular space 180, control slots 129, 148, bores 140, 139, and 138, slots 140, 136, chamber 51 and vent V, and as previously stated the chamber 51 is in continuous communication with the atmosphere via the vent V. Accordingly, the power cylinder PC may be termed "air-suspended" when the movable power assembly PA and related parts are in their respective normally released positions as shown in FIGURES 1 and 2.

Initial depression of the pedal P to the first dashed line position of FIGURE 1 simultaneously moves the valve sleeve and piston 120, 121, movable power assembly PA, pressure-transmitting member 190 and hydraulic pistons 200, 237 which advances the piston cup seal 206 into the hydraulic pressure-producing chamber 22 to a position exemplarily shown in FIGURE 8 wherein the compensating port 23 has been closed thereby conditioning the master cylinder HC for operation to pressurize on the liquid confined in the working chamber 20 and displace the same through the one-way check valve 226 and discharge port 13 into the hydraulic lines 14 to energize the wheel cylinders 15 thus expanding the brake shoes into contact with the internal cylindrical surface on the brake drums rotatable with the vehicle road wheels to apply the brakes. This unitary initial movement of the components aforesaid effected by the pedal P in conjunction with the preloaded status of the control valve return springs 188 which commercial practice dictates that the combined pretensioned weight of these springs should be established at 25–30#. These springs when installed under the suggested preloaded strength are capable of overcoming the hydraulic piston return spring 229 which also controls the residual pressure check-valve RV, and therefore, in commercial practice is usually set to establish a normally preloaded condition of 8–12 pounds against the residual check-valve to maintain a minimum line pressure in the hydraulic lines external to the pressure working chamber 20 corresponding substantially to the installed weight of this spring. Continued pressure on the pedal P, after the compensating port 23 has been closed in the manner aforesaid, further advances the hydraulic pistons 200, 237 into the pressure cylinder 22 along with the movable wall PA and control valve CV until the hydraulic pressure build-up against the heads of these two pistons aforesaid slows movement thereof causing the spring 188 to yield whereby the valve piston 121 begins to move relatively to the valve sleeve 120 toward the rear face of the thrust-plate 185 carrying with it the spring seat 165 opposed by increasing tension thereon from the reactive spring 244, and the reactive rod 195 into contact with the confronting central portion of the bottom wall 207 of the cup seal 206, whereupon further pressure on the pedal P moves the valve piston 121, spring seat 185, thrust rod 195 to a greater relative disposition with respect to the movable power assembly PA, pressure-transmitting member 190 and piston 200 to displace the spring seat 230 out of engagement with the cup seal wall 207 thereby removing reaction of spring 229 from the piston 200 and diaphragm power assembly PA. At this point the working land 140 on the valve piston 121 has slightly "cracked" the control slot 129 and fully isolated the latter from the control slot 148 thus placing the annular vacuum-power space 143 in communication with the vacuum chamber 50 via the annular space 180 and holes 181 to operably energize the power assembly (see FIGURE 8). The relative operating movement between the valve piston and sleeve being provided by the space normally obtaining between the thrust plate 185 and annular flange 196 defining the inner terminus of the reactive rod 195 (see FIGURE 2). The aforesaid relative movement of the valve piston 121 moves the annular vacuum space 143 into increasing exposure to the control slot 129 which causes evacuation of air from the vacuum-power chamber 50 via the space corresponding to the relative movement of the spring seat flange 168 from the confronting face of the diaphragm plate 52 which enables atmospheric pressure acting across the diaphragm plate 53 to operatively energize the same and the connected hydraulic piston 200 to move forwardly as viewed in FIGURE 8A to thus provide power assistance in applying the brakes.

The operator is apprised of the degree of braking pressure being developed before and during the effectiveness of the power phase by the hydraulic thrust reacting on the pedal P via the piston 237, rod 195, valve piston 121 and push rod 102, and by the reactive and return springs 229, 244 via their respective spring seats 230, 165. These latter two springs being characterized by increasing tension above a normally preloaded condition progressively induced in response to increasing movement on the pedal P in a brake-applying direction, and these two springs also perform the additional function of urging the movable parts of the device A back to their respective released positions clearly portrayed in FIGURE 2 in response to removal of pressure from the pedal P to release the brakes. With the control valve elements 120, 121 assuming their respective released positions, the relative operating movement therebetween is restored in readiness for another brake-applying cycle as above described. It is important to note that when the pedal P is operating in a brake-applying direction that the springs 229 and 244 do not oppose the power phase provided by the energized power assembly PA thus power-loss cannot occur in the present mechanism from spring resistance enabling full power application to the piston 200 to operate the hydraulic system which contributes to utilization of a smaller diameter power cylinder than would ordinarily be required where such return springs oppose movement of the power member.

The operational behavior of the reactive and return spring 244 referred to above is unique in that it produces control characteristics in the way of reaction against which the control valve piston 121 is adjusted to control energization of the vacuum-motor PC. This reaction increases above normal preloaded status of this spring in direct proportion to the distance the brake-pedal P is depressed from its solid line position in FIGURE 1, and therefore, such spring resistance alone would not necessarily have a magnitude correlated with the amount of braking force in effect at every position of the brake-pedal, and too, pedal-load would increase toward the end of the full operating stroke of the fluid-displacing unit (hydraulic pistons 200, 237 and plunger member 190) actuated by the vacuum-motor to an undesirable degree which would defeat the objective of reduced pedal effort.

As this spring is additionally compressed above its normal preloaded status, it provides increasing resistance in relation to pedal movement up to the point the braking fluid becomes initially pressurized as defined by the thrust-transmitting capacity of the springs 188 in substantially preloaded condition, and thereafter, resistance becomes substantially constant on the pedal P as a consequence of the substantially stationary condition of the fluid-displacing parts aforesaid acting on the non-compressible column of braking fluid as is understood. Since the fluid becomes pressurized at different stations along the full operating stroke of the motor-actuated tubular member 190 due to wear on the brake linings and parts, and to leakage of the various seals in the hydraulic system, it will be appreciated that if the pressurized state of the fluid to apply the brakes becomes effective toward the end of the operating stroke aforesaid, that the reaction from spring 244 can become severe resulting in a moderately "hard-pedal" due to corresponding buildup in the force of this spring from its normal status, the latter providing the operator with accurate sensing to initially apply the brakes thus preventing sudden braking applications which could possibly result in a power-surge if the operator lacks such awareness as he applies the brakes.

Reduction of this spring reaction principle to commercial usage, has demonstrated that the preloaded weight should be approximately 20# and rated at maximum compression corresponding to the end of the full operating stroke of the member 190, at 60# pressure which when transmitted through the pedal leverage ratio reacts on the operator's foot at 5 to 15# through the full operating range of the member 190 where a normal height pedal is employed; but if the pedal ratio is lowered to accommodate use of a "low-pedal" with less mechanical advantage, reaction from this spring increases proportionally to such ratio change to the extent that the low-pedal is converted into a moderately "hard-pedal" as aforesaid through the stage of operating the control valve piston 121 from normal position to operating position as demonstrated in FIGURES 2 and 8 respectively wherein the vacuum-motor PC is in readiness to be energized. Accordingly, this spring serves to best advantage as a reaction means by utilizing its yielding resistance through substantially the first-half of the series potential pressurizing movements along the full operating stroke of the tubular member 190 and associated parts which may be had by keeping the brakes properly adjusted and the system free of leaks which service operations contribute to safer driving. If a lower rated spring is utilized then reaction of sufficient magnitude at points beyond the half-way mark of the pressure-transmitting member 190 stroke in a pressure applying direction does not provide the operator with the necessary physical perception of the braking force applied.

The reaction control characteristics just described in connection with spring 244 are also provided by spring 229 at a much less magnitude since this latter spring also serves to control the residual pressure valve RV. Therefore, spring 229 alone is incapable of producing the necessary resistance to pedal movement but its reaction does supplement the reaction of spring 244 against which the pedal P is adjusted to control the vacuum-motor PC in a brake-applying direction of operation.

It is therefore, seen that after the slack has been substantially taken up in the system, liquid pressure reacting on the hydraulic pistons 200 and 237 substantially arrests further pedal movement thereof under influence of the thrust-transmitting capacity of valve return springs 188 in substantially preloaded status, and in consequence additional pressure on the pedal P is required to overcome the valve return springs 188 and reaction on the piston 237 to effect relative movement of the valve piston 121 with respect to the valve sleeve or movable power assembly sufficiently to "crack" the control slot 129 enabling evacuation of the vacuum power chamber 50 to set up the aforesaid differential pressures across opposite sides of the diaphragm plates 52, 53 causing the movable power assembly PA to move leftward substantially proportional to the extent of pedal movement as illustrated in FIGURE 8—second dashed line position of the pedal P in FIGURE 1.

It is important to further observe that the magnitude of the reduced hydraulic reaction on the pedal P exerted by the pressurized braking fluid on the end of the reactive piston 237 can be varied in accordance with the diameter of such element. However, this reduced reactive force will always be proportional to the force with which the brake shoes are frictionally applied to the vehicle brake drums, to provide the operator with accurate sensing of the amount of braking force being applied. This hydraulic reaction principle is in sharp contrast to the control characteristics produced by springs 229, 244 against which the control valve piston 121 is adjusted to control operative energization of the vacuum-motor PC since resistance to depression of the pedal P increases in direct proportion to the distance it is depressed rather than pressure conditions to which the reactive piston 237 is subjected.

The foregoing operational description completes what may be termed the "applied stage." With the brakes in applied condition corresponding to the operated condition of the device A as portrayed in FIGURE 8 (pedal P at second dashed line position in FIGURE 1), if operator force on the pedal P is halted, the movable power assembly PA will slightly advance in a brake-applying direction carrying with it the valve sleeve 120 relatively to the valve piston 121 to produce what may be termed the "poised or holding stage" at any applied position of the hydraulic piston 200. This latter operating stage results from the usual follow-up action of the control valve elements 120, 121 which effects "lapping" of the working land 150 and control slot 129 induced by the aforesaid relative advancing movement. Thus, the brakes may be held "on" with minimum operator effort on the pedal P as a result of substantial counterbalance between the differential pressures acting on the power diaphragm PA and the existent hydraulic pressure in the hydraulic lines 14 exerted on the head land 201 of the piston 200. If the booster motor PC should fail to be effective or inadequate to provide the required power assistance, then the force exerted by the operator on the pedal P can be increased to bring the annular flange 196 on the end of the reactive rod 195 into engagement with the confronting portion of the thrust-plate 185 wherein the relative operating movement aforesaid is fully taken up and the pair of valve elements 120, 121 relatively positioned wide open with respect to the vacuum-power source and power chamber 50, enabling the operator to cooperate with the power thrust on the piston 200 to attain the degree of pressure in the hydraulic lines according to the braking force required to stop the vehicle. With the power phase effective, however, incremental depressing and releasing movements of the pedal P cause corresponding follow-up movements substantially of the movable power assembly PA to assist in applying and releasing the vehicle brakes WB in a well known manner.

Due to the exactness of the follow-up action of the control valve means CV and the ever present reaction from the springs 229, 244 on the pedal supplemented by the hydraulic thrust on the end of the reactive piston 237 also connected to the pedal via the reactive rod 195 and valve piston 121, there is never any tendency of the power phase to "overbrake" at any given applied position of the pedal movement which contributes the highly desirable feature of smooth stops at low vehicular speeds with instinctively predictable control. At higher speeds dangerous "grabbing" or "locking" of the vehicle ground wheels is prevented thus producing smooth vehicular deceleration with reduced operator effort, in accordance with the pressure applied on the brake pedal.

When pressure on the pedal P is removed, springs 229, 244, and 188 react to reset the hydraulic pistons 200, 237 and associated working parts back to their respective fully retracted or released positions wherein the relative operating movement between the valve elements 120, 121 is reestablished, the flange 151 abuts the confronting reduced diameter end 126 of the valve sleeve 120 and the end 135 of the valve sleeve engages the confronting portion on the power cylinder end wall 38, to thus re-establish the "released" or "brake off" disposition of the device A shown in FIGURE 2 in which the vacuum-power chamber 50 is vented to atmosphere via the vent V. As air enters the vent V it flows into the atmospheric chamber 51 through the end slot 136, cross slot 146, cylindrical counterbore 139, bore 140, control slots 148, 129, annular space 180, holes 181 into the power chamber 50 whereby the differential pressures are reduced, and eventually dissipated, enabling the springs 229, 244, and 188 to re-establish the positions of the parts as shown in FIGURE 2 in readiness for another brake-applying cycle. It is important to note here that in the releasing operation aforesaid to take the brakes "off," the spring 229 first urges the reactive piston 237 to the position of FIGURE 2 with respect to the larger power-operated piston 200 and then acts on the larger piston 200 through the spring seat 230 to urge both pistons back to their normally released positions, while the reactive spring 244 cooperates to simultaneously urge the movable power assembly PA to its fully released position as the valve return springs 188 cooperate to return the valve elements 120, 121 to their respective released positions. Prior to the working parts of the device A reaching their respective released positions shown in FIGURE 2, all three springs 229, 244, and 188 are cooperating to urge the movable power assembly PA back to its normally released position, these three springs acting in the following sequence: Spring 229 first reacts on the piston 237, rod 195 and valve piston 121 in cooperation with springs 188 and 244 to return these parts and springs 229, 244 subsequently become effective on the piston 200 to return it along with the power diaphragm PA and valve sleeve 120. Accordingly, it is seen that the three springs above possess novel interaction to provide reaction on the pedal P in a brake-applying direction of movement and when the pedal is released, they team up in a different manner to restore the working parts of the device A to their respective normally released positions by providing the operator with an awareness of a progressively diminishing rate of reaction simulating the releasing operation of a pedal-operated master cylinder devoid of power assistance and commonly employed as the actuator for conventional hydraulic braking systems.

If the leverage advantage is decreased between the pedal P and push rod 102 to provide what may be termed a "low pedal," with a shortened stroke, then the weights of the springs 188 would be reduced from the 25–30# preload to bring the power phase in earlier and at a point where the power would be effective to move the piston 200 to close the compensating port 23. That is to say, that the springs 188 and spring 229 would be installed at substantially the same preloaded weights, and the auxiliary reactive spring 244 would be also reduced in installed weight and could be eliminated entirely without affecting the operativeness of the present brake-booster A. The spring 244 is considered essential where normal height pedals are employed since such pedals possess high mechanical advantage over the master cylinder HC thus more initial resistance is needed to prevent the brake application from being too sensitive which added resistance is provided by the spring 244. If a more delayed effectiveness of the power phase is desired, this may be obtained by increasing the installed weight of the valve return springs 188 as the heavier these springs are installed, the more operator force is required on the piston 200 before the inner valve element 121 can open the control slot 129 to vacuum, thus a greater initial pressure on the liquid in the pressure chamber 20 is developed prior to the power phase becoming effective to assist the foot-operation.

The present invention further contemplates that the power cylinder PC may take the form herein disclosed or the complemental casing 35 may take the same form as casing 30 and, therefore, not integral with the firewall 36 thus requiring suitable mounting means for attaching the casings 30, 35 as a unit to the firewall as is commercially practiced in installing power-brakes on present-day motor vehicles and the like. However, it should be appreciated that forming one half of the power cylinder PC as an integrated portion of the vehicle firewall provides the advantages of reduced length, greater compactness, and requires less space for installation and provides a more rigid assembly with the vehicle proper and therefore, less subject to distortion under influence of the pedal operating force.

*Modified Hydraulic Piston Spring Seat and Operation (FIGURE 9)*

Figures 9, 10:
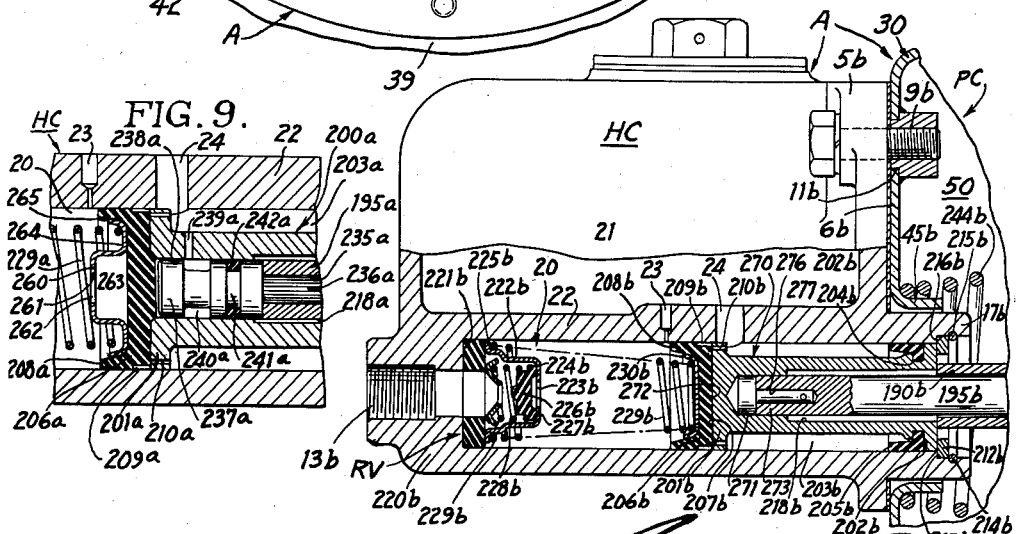
FIGURE 9 is a modified master cylinder piston return spring seat providing reaction on the power-actuated piston only.
FIGURE 10 is a modified pedal master cylinder piston construction which eliminates the coaxial smaller piston for transmitting proportional hydraulic thrust from the master cylinder pressure chamber to the pedal mechanism.

FIGURE 9 illustrates a modified spring seat construction for the piston end of the spring 229 to replace the spring seat 230 shown in FIGURES 1 through 8. This modified seat member generally designated 260 is of cup-shaped configuration in cross section and comprises: an end wall 261 having a central opening 262, a cylindrical wall 263 terminating in an outturned flange 264 parallel with the end wall, said flange periphery being formed with an angular marginal portion 265 for stiffness. The smaller end of the conical spring 229a lies between the cylindrical wall 263 and marginal portion 265 in engagement with the flange 264 which bears on the portion of the bottom wall 207a of the cup seal 206a in contact with the face of the piston head 201a, the hollow space within the cylindrical wall 263 is opposite the central portion of the cup bottom wall which is engaged by the end of the piston 237a, thus restoring the action of the spring 229a to react only on the piston 200a as a return spring which eliminates the reactive function of this spring on the piston 237a, rod 195a, inner valve element 121a, push rod 102a and the pedal P.

In operation, this novel modified spring seat member transmits the reaction of the spring 229a to the flanged portion thereof, thence to the confronting portion on the bottom wall 207a of the cup seal 206a to the piston head 201a to constantly bias this piston toward its fully retracted position as shown in FIGURE 2. During relative operation of the piston 237a and inner valve element 121a to cause the power cylinder PC to be energized, the central portion of the cup bottom wall 207a is deformed forwardly to accommodate such movement and freely received within the hollow aforesaid of the spring seat member without engaging the end wall 261 thereof. Accordingly, the piston 237a is subject only to hydraulic thrust which is transmitted through the rod 195a to the inner valve element 121a and thence to push rod 102a and pedal P to supplement the progressive increasing resistance provided by the reactive spring 244a on the pedal P to give the operator a sensing of the degree of braking force in effect at any given position of the pedal. In installations utilizing this modified spring seat, the preloaded strength of the spring 244a should be increased to replace the loss of reactive force provided by the spring 229a reacting on the seat 230 of the first disclosure.

*Modified Master Cylinder Piston and Operation (FIGURE 10)*

FIGURE 10 illustrates a modified master cylinder piston construction adapted to replace the reactive piston 237 and thereby eliminate the passageway 239 and proportional hydraulic thrust on the pedal P and the supplemental reaction provided by the spring 229. This modified piston is generally designated 270 and comprises: the counterbore 218b and a coaxially disposed blind bore 271, the latter bore providing a solid end face 272 for the head land 201b against which the bottom wall 207b of the cup seal 206b bears. The free end 273 of the reactive rod 195b is loosely piloted in the bore 271 and sufficiently spaced normally from the closed end of said bore to accommodate the aforesaid relative operating movement of the valve control elements 120b and 121b. An axial blind bore 276 is provided in the free end of the rod 274 and which is intersected by cross bores 277 to connect the space ahead of the rod end and the counterbore 218a to relieve any tendency for compressive effects to build up between the rod end and closed end of the bore 271.

In operation, this modified piston functions in the conventional manner. The smaller end of the conical spring 229b reacts on the spring seat 230b to constantly bias the piston 270 toward its fully retracted position wherein the shoulder flange 202b engages the backing washer 212b. This piston is operated in its pressure producing direction of movement by the pressure-transmitting member 190b acting on the flanged shoulder 202b in the same manner as described in connection with the first disclosure (FIGURES 1 through 8). The rod 195b in the instant modification serves only as a guide and support for the pressure-transmitting member 190b and connected parts, and therefore, maintains the working parts in proper alignment. Inasmuch as the hydraulic thrust reaction on the piston 237 is eliminated as well as the reaction from the spring 229b, the preloaded strength of the spring 244b should be raised to provide a proper reaction feel on the pedal P for the operator's guidance in applying the brakes. However, it should be noted that this latter spring should not be overweighted since in the event of no power to assist in the brake-applying operation, increased foot effort would be required to overcome this spring over that normally used in operating conventional foot-operated master cylinders, it being an aim of the present invention, to utilize substantially the same physical effort to operate the present device A as required in straight foot-operated systems, should the device A be without power assistance.

From the foregoing description, considered with the various illustrations of the different embodiments of my invention, it will be appreciated that certain interrelated components of the liquid pressure-producing device A possess similar functional characteristics such that interchangeability is readily effected, particularly in connection with the power controlling features, installation on the firewall of the motor vehicle exemplarily depicted as partially integrated therewith, and the different forms of the master cylinder piston construction, as well as the elimination of certain components from the structure without impairing the operativeness of the device A. With reference to the interchangeability of components aforesaid, it should be noted that the movable wall PA may be controlled with substantially equal efficiency by either a low or normal height pedal. The reactive spring 244 may be eliminated as well as hydraulic thrust on the reactive piston 237, and the valve return springs 188 may be modified in strength to vary the stroke of the pedal required to inaugurate the power phase, and the hydraulic piston 200 may be substantially conventional in construction as portrayed in FIGURE 10, or combined with a coaxially disposed reactive piston such as illustrated at 237 to provide proportional hydraulic thrust reaction on the pedal P, and the reactive function of the spring 229 may be eliminated so that this spring serves only as a return spring for the piston 200.

Reference is now made to the terminology used in the foregoing description and in the appended claims in which the identifying expressions and/or terms employed are intended to convey meanings which include the range of reasonable equivalents in the patent sense. For example, the expressions "motor," "power cylinder," "apparatus," "power mechanism," "device," "power device," "vacuum-power cylinder," "power assembly," "booster," "power booster" are intended to include any casing and/or chamber having a pressure-responsive movable assembly therein, whether such assembly includes a solid piston or a flexible diaphragm, or some other member serving the same purpose, or whether the casing as a whole is detachably mounted on a member of the motor vehicle and the like or partially integrated therewith. The terms "front," "rear," "forward," "end," "bottom," "top," "right," "left," and other directional words or charactetrs are intended to have only relative connotation for convenience in describing the structure as illustrated in the drawing, and are not intended to be interpreted as requiring any particular orientation with respect to associated structure external to the present disclosure or the operating position thereof.

Although several particular embodiments of my invention have been disclosed herein and which are believed well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In a brake booster system for fluid column operated brakes comprising a master cylinder having a supply reservoir therefor, fluid-displacing means including an axially bored plunger advanceable in such master cylinder to compress such column of fluid to a brake-applying pressure, a pressure differential actuated booster motor including a power cylinder having a pair of longitudinally spaced end walls provided with central coaxial openings, a power member movable therein from a normally released position to advance said plunger, a pair of variable compartments in said power cylinder, one on each side of said power member, and in which pressures are balanced when the power member is in its released position, a stop member on the power cylinder for establishing released position of said power member: a central opening through said power member co-axially disposed with respect to the openings in the end walls of said power cylinder; a source of pressure different from atmosphere to produce said pressure differences in said compartments to move said power member; an operator-operated member having a normally released position; follow-up control valve means including an inner and outer relatively movable telescopically-related members, said outer member being mounted on said power member for movement as a unit, and the inner member operably projects through the opening in said power member and one of the openings in the power cylinder for slidable support by the latter; fluid passageway means for connecting said source to said outer valve member; a pair of cooperating control ports in said valve members for selectively connecting one of said compartments to said source to create said differential pressures in said compartments, and for disconnecting said one compartment from said source and connecting it to the other compartment to balance pressures within said compartments to produce "on" and "off" positions respectively of control of said valve members, in response to operating said operator member from released position into engagement with said inner valve member; normally preloaded spring means for biasing said valve members to relative "off" positions upon release of said operator member; a coaxial extension on said inner valve member slidably disposed in the axial bore of said plunger, the end of said extension being adapted to receive hydraulic reaction from the master cylinder; complemental abutting means carried respectively by said plunger and inner valve member for limiting the relative operating movement of said valve members under influence of said operator-operated member, said abutting means being effective when said limited movement is taken up for transmitting force from said operator member directly to said plunger to operate said master cylinder in cooperation with or independently of said motor.

2. A brake booster system according to claim 1 in which said power cylinder comprises: a detachable cup-shaped shell open at one end and closed at the other by one of said walls, said open end terminating in a circular outstanding flange parallel to said end wall, a complemental cup-shaped depression in a support member for the operator member and detachable shell, a plurality of spaced holes in registering disposition through the flange of the detachable shell and said support member, and a like number of fasteners projecting through said registering holes to secure said shell and support member in a unitary assembly.

3. A brake booster system according to claim 2 in which said power member comprises: a flexible member having its peripheral marginal portion disposed between said flange and confronting portion which encircles said depression in said support member, and provided with a like number of holes therein in registering relation with respect to the holes in the flange and support member aforesaid through which said fasteners project to impinge the peripheral marginal portion of the flexible member in air-tight sealed relation as a unitary assembly with said detachable shell and support member.

4. A brake booster system according to claim 3 in which said support member is the firewall of a motor vehicle.

5. A brake booster system according to claim 1 in which said control valve means comprise: a fluid passageway in the outer member connected to said source, a first control port in said outer member leading to said one compartment, an annular fluid chamber on said inner member connected to said fluid passageway, a pair of longitudinally spaced annular lands on said inner member defining said annular fluid chamber, one of which is a working land and the other a bearing land, a blind axial bore in the inner member, a counterbore merging with said axial bore to produce an internal annular abutment therebetween, said counterbore opening to atmosphere, and a second control port in said inner member intersecting its axial bore to cooperate with said first port to connect said one compartment to atmosphere whereby said motor is inactivated when said valve members are in relative "off" positions, and a projection carried by said inner member for engaging said outer member to establish said relative "off" positions thereof.

6. A brake booster system according to claim 1 in which said spring means comprise: a movable spring seat member normally juxtaposed in engaging relation with said power member and inner valve member to establish them in their respective normally released and "off" positions, and a normally preloaded spring in said power cylinder reacting between said seat member and power cylinder to effect such engaging relation.

7. A brake booster system according to claim 6 in which said spring means comprise: a plurality of radially disposed longitudinally projecting extensions fixed at one end to said power member for movement therewith and projecting through a like number of holes in said spring seat member; a pair of spaced abutments terminating the free ends of each of said radial extensions; a thrust plate having a central opening through which said first-mentioned extension disposed in the axial bore of said plunger projects, with the marginal portion of said last-mentioned opening engaging said plunger to enable said power member to advance the latter; a like number of radially disposed holes through said thrust plate through which the free ends of said radial extensions project between said corresponding number of pairs of abutments thereon to establish said thrust plate in fixed longitudinally spaced relation with respect to the power member; and a helically formed normally preloaded compression spring freely encircling each of said radial extensions with its opposite ends reacting between the confronting marginal portions on the thrust plate adjacent said pair of abutments and on said spring seat member to urge the latter into simultaneous engagement with said power and inner valve members.

8. In a brake booster mechanism for use with a hydraulic master cylinder having a fluid-displaced member operable therein, said member being operable in part by a pressure fluid operated motor having a casing provided with a wall movable therein under influence of a pressure differential on opposite sides thereof: follow-up valve mechanism comprising an inner and outer element relatively movable in telescopically-related engagement, said inner element being slidably supported on said motor casing, and having one position to establish equal pressures on opposite sides of said wall to inactivate the motor and a second position to establish differential pressures on opposite sides of said wall to activate said motor; a source of pressure different from atmosphere connected to said outer valve element; an operator-operated member having a normally released position and connected to said inner valve element to activate the same relatively to the outer element; reaction means including a normally preloaded spring for opposing activation of said valve mechanism to power-activate said motor, said spring being characterized by increasing reaction on said inner valve element progressively induced as a function of its compressive status effected by the operating movement of the operator member from normal position; and spring means including a normally preloaded spring reacting between said valve elements to establish their one position.

9. In brake booster mechanism including: a pressure fluid operated motor having a casing provided with a movable wall actuated by a pressure differential on opposite sides thereof; a master cylinder having a supply reservoir therefor; an axially bored hydraulic fluid-displacement member operable in the master cylinder and connected with said wall for actuation thereby; follow-up valve mechanism comprising an inner and outer element relatively movable in telescopically-related engagement, said inner element being slidably supported on said motor casing, and having one position to establish equal pressures on opposite sides of said wall to inactivate the motor and a second position to establish differential pressures on opposite sides of said wall to activate said motor; a source of pressure different from atmosphere connected to said outer valve element; an operator-operated member having a normally released position and connected to said inner valve element to activate the same relatively to the outer element; and combined hydraulic and spring reaction means including a plunger slidably disposed in said axial bore and which receives proportional pressure reaction from said master cylinder in coaxially engaging relation with said inner valve element, and a normally preloaded compression spring characterized by increasing reaction on said inner valve element progressively induced as a function of its compressive status in accordance with the distance said fluid-displacement member is operated into said master cylinder.

References Cited in the file of this patent

UNITED STATES PATENTS

| | | |
|---|---|---|
| 2,130,799 | Hofstetter | Sept. 20, 1938 |
| 2,690,740 | Hupp | Oct. 5, 1954 |
| 2,790,306 | Ingres | Apr. 30, 1957 |
| 2,800,770 | Edge | July 30, 1957 |
| 2,828,719 | Ayers | Apr. 1, 1958 |
| 2,832,316 | Ingres | Apr. 29, 1958 |

FOREIGN PATENTS

| | | |
|---|---|---|
| 747,273 | France | Mar. 28, 1933 |

UNITED STATES PATENT OFFICE
CERTIFICATE OF CORRECTION

Patent No. 3,040,535                                June 26, 1962

Glenn T. Randol

It is hereby certified that error appears in the above numbered patent requiring correction and that the said Letters Patent should read as corrected below.

Column 5, line 71, for "72, 73", in light-face type, read -- 72, 73 --, in bold face type; column 10, line 4, beginning with "The pressure working" strike out all to and including "depicted in FIGURE 2." in line 31, same column 10; column 11, line 26, for "released" read -- releasing --; column 12, line 44, strike out "on"; line 71, for "spring" read -- springs --; column 14, line 48, after "series" insert -- of --; column 19, line 10, for "characetrs" read -- characters --.

Signed and sealed this 19th day of November 1963.

(SEAL)
Attest:

ERNEST W. SWIDER
Attesting Officer

EDWIN L. REYNOLDS
Acting Commissioner of Patents